US009440358B2

(12) United States Patent
Setrakian

(10) Patent No.: US 9,440,358 B2
(45) Date of Patent: Sep. 13, 2016

(54) ROBOTIC TOOL CHANGE SYSTEM

(71) Applicant: Mark Setrakian, Los Angeles, CA (US)

(72) Inventor: Mark Setrakian, Los Angeles, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 532 days.

(21) Appl. No.: 13/900,654

(22) Filed: May 23, 2013

(65) Prior Publication Data

US 2013/0313791 A1 Nov. 28, 2013

Related U.S. Application Data

(60) Provisional application No. 61/650,820, filed on May 23, 2012.

(51) Int. Cl.
*B25J 15/00* (2006.01)
*B25J 15/04* (2006.01)
*B25J 19/00* (2006.01)

(52) U.S. Cl.
CPC ......... *B25J 15/0019* (2013.01); *B25J 15/0033* (2013.01); *B25J 15/0433* (2013.01); *B25J 19/0029* (2013.01); *B25J 15/0038* (2013.01); *Y10T 74/20311* (2015.01); *Y10T 279/1986* (2015.01); *Y10T 279/3406* (2015.01)

(58) Field of Classification Search
CPC .............. B25J 15/0033; B25J 15/0019; B25J 15/0433; B25J 19/0029; B25J 15/0042; B25J 15/0004; B25J 15/0009; B25J 15/0014; B25J 15/0038; Y10T 279/3406; B23B 31/16012; B23B 31/16204; B23B 31/202

USPC ................................ 901/30, 39, 41; 249/213
See application file for complete search history.

(56) References Cited

U.S. PATENT DOCUMENTS

| | | | | |
|---|---|---|---|---|
| 4,368,913 A | * | 1/1983 | Brockmann | B25J 15/0266 294/106 |
| 4,452,479 A | * | 6/1984 | Terai | B25J 15/0009 294/106 |
| 4,545,723 A | * | 10/1985 | Clark | B25J 15/04 294/86.4 |
| 2007/0107917 A1 | * | 5/2007 | Doherty | F41C 27/04 172/192 |
| 2008/0073922 A1 | * | 3/2008 | Holtz | B25J 15/0213 294/198 |
| 2010/0095799 A1 | * | 4/2010 | Albin | B25J 15/0213 74/490.01 |
| 2010/0101356 A1 | * | 4/2010 | Albin | B25J 5/005 74/490.03 |
| 2010/0164243 A1 | * | 7/2010 | Albin | B66F 9/065 294/106 |
| 2012/0299322 A1 | * | 11/2012 | White | B25J 15/0019 294/213 |

* cited by examiner

*Primary Examiner* — Eric A Gates
*Assistant Examiner* — Paul M Janeski
(74) *Attorney, Agent, or Firm* — Tarolli, Sundheim, Covell & Tummino LLP

(57) ABSTRACT

A robotic tool system includes a gripping mechanism having a pair of movable jaws that extend along a longitudinal axis. Each jaw has a convex inner surface relative to the axis that cooperate to define a first adaptor. A tool assembly includes a tool and a second adaptor connected to the tool and having a biconvex projection. The jaws are movable towards one another from a first condition spaced from the second adaptor to a second condition in which the first adaptor engages the second adaptor to securely fasten the tool assembly to the gripping mechanism.

15 Claims, 8 Drawing Sheets

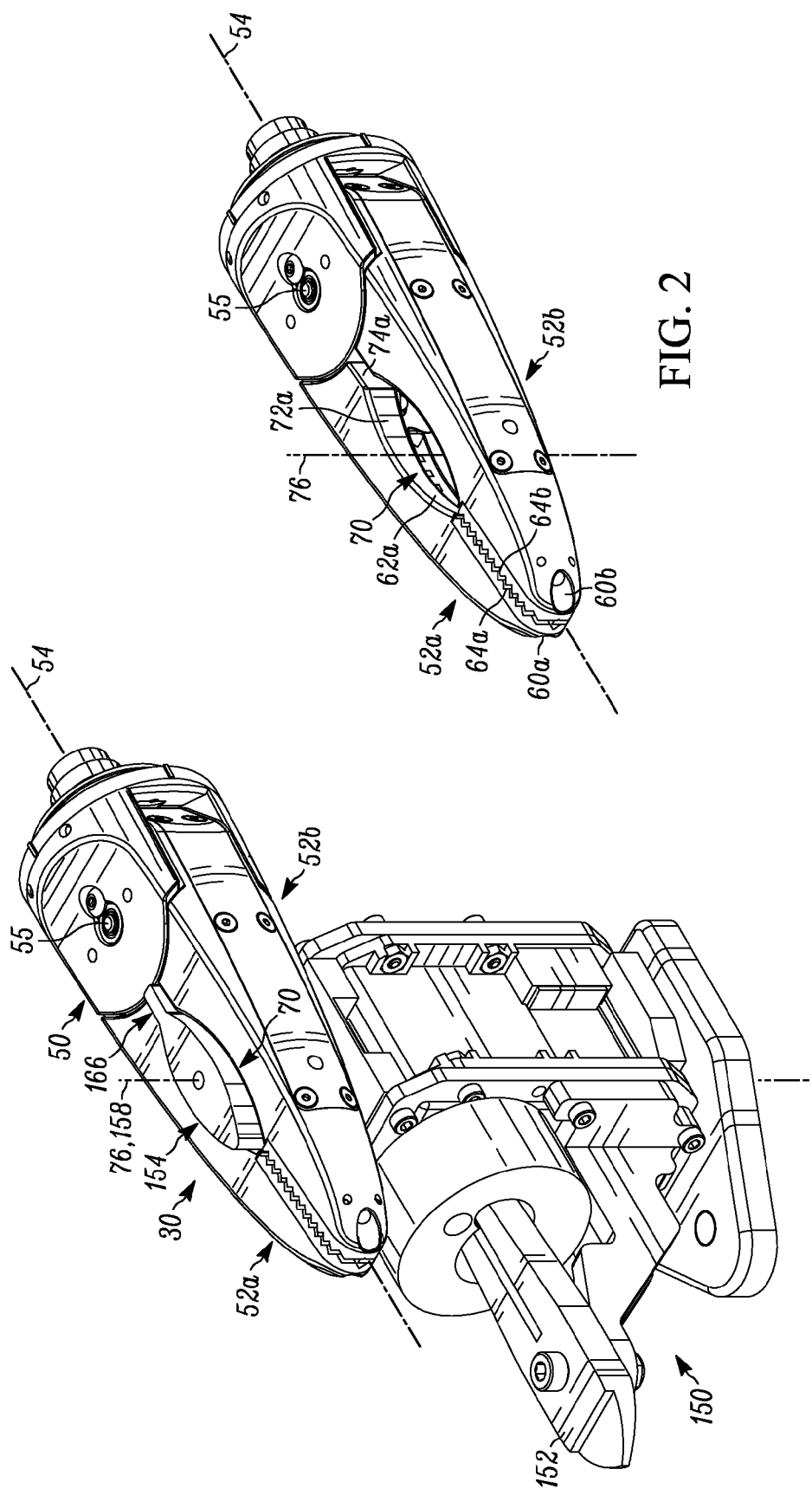

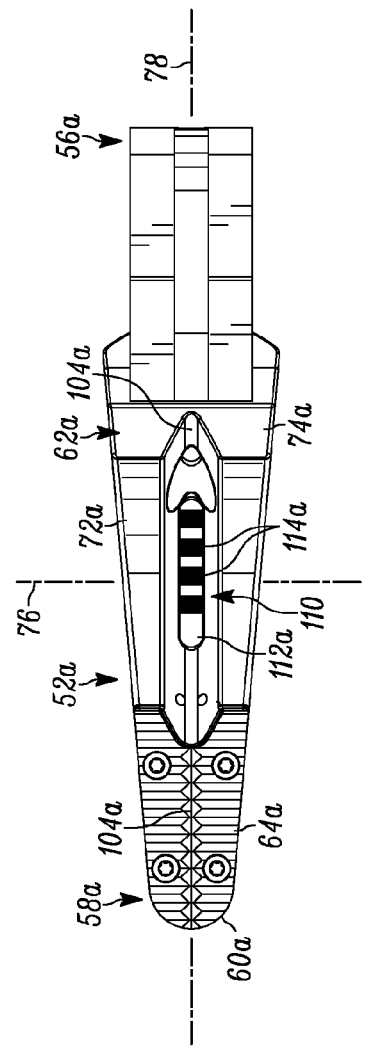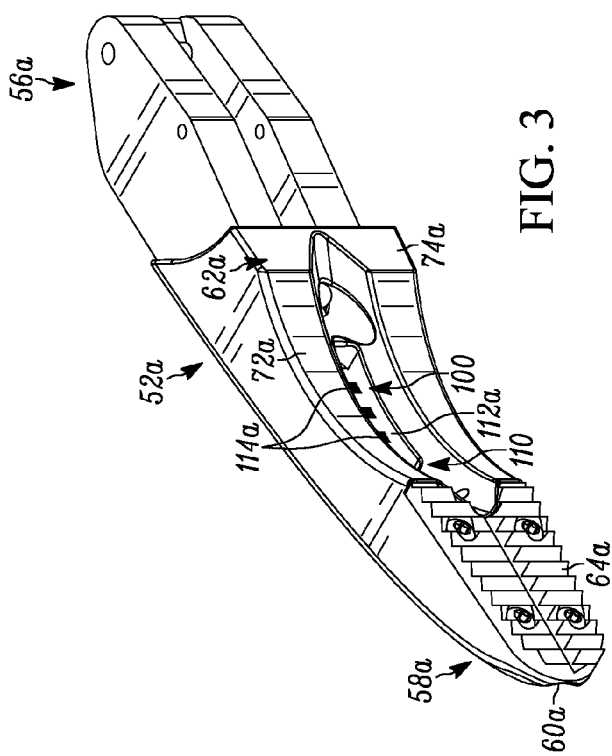

ROBOTIC TOOL CHANGE SYSTEM

RELATED APPLICATIONS

This application claims the benefit of U.S. Provisional Application Ser. No. 61/650,820, filed 23 May 2012, the subject matter of which is incorporated herein in its entirety.

TECHNICAL FIELD

The invention relates to robotics and, in particular, relates to self-aligning adaptors for connecting a robotic arm to a tool.

BACKGROUND

Many computer numerical control (NC) machining systems and industrial robots are capable of changing end effectors to extend the utility provided by a single machining system or robot. For example, most NC mills are equipped with a pneumatic collet within the spindle that can automatically exchange between a variety of tools, e.g., mills, drills, and taps. Similarly, many robotic arms feature an electrical and pneumatic coupling interface between a "master side" and a "tool side" that allows for a variety of tools, e.g., grippers, welders, and deburring tools, to be connected to the end of the arm.

Such systems for exchanging end effectors, however, require extremely precise relative alignment between the locking components of the spindle or robotic arm and the tool. For example, the coupling interface between male and female locking components requires precise axial alignment and precise angular alignment of the electrical contacts and pneumatic ports thereon. Accordingly, tools not currently in use must be stored in precise, known locations to ensure reliable engagement. This necessitates the use of accessories like a tool stand.

Similarly, in NC machining systems, tools are typically stored and rotated for insertion into the collet by a tool change rack. These systems are unsuitable for some robots, e.g., teleoperated robots, as a human operator spends too much time maneuvering the robotic arm to and from the tool stand and attempting to achieve the precise alignment required for mating the robotic arm to the desired end effector.

SUMMARY OF THE INVENTION

In accordance with an aspect of the present invention, a robotic tool system includes a gripping mechanism having a pair of movable jaws that extend along a longitudinal axis. Each jaw has a convex inner surface relative to the axis that cooperate to define a first adaptor. A tool assembly includes a tool and a second adaptor connected to the tool and having a biconvex projection. The jaws are movable towards one another from a first condition spaced from the second adaptor to a second condition in which the first adaptor engages the second adaptor to securely fasten the tool assembly to the gripping mechanism.

In accordance with another aspect of the present invention, a robotic gripping mechanism includes a pair of movable jaws. Each jaw has a convex inner surface that cooperate to define a first adaptor having a spheroid shape. A tool assembly includes a tool and a spheroid second adaptor connected to the tool. The jaws are movable towards one another from a first condition spaced from the second adaptor to a second condition in which the first adaptor engages the second adaptor to securely fasten the tool assembly to the gripping mechanism. Engagement of the first adaptor with the second adaptor when the second adaptor is misaligned with the first adaptor automatically corrects at least one of angular and longitudinal misalignment between the adaptors to allow the jaws to reach the second condition.

In accordance with yet another aspect of the present invention, a robotic tool system includes a gripping mechanism having a pair of movable jaws that extend along a longitudinal axis. Each jaw has a convex inner surface relative to the axis and a linear surface extending from the convex surface that cooperate to define a substantially spheroid first adaptor. A first electrical coupling has a plurality of electrical contacts positioned within at least one jaw. A tool assembly includes a tool and a second adaptor connected to the tool. The second adaptor includes a spheroid projection and a rectangular fin that extends from the projection. A second electrical coupling has a plurality of electrically conductive pins located on the second adaptor. The jaws are movable towards one another from a first condition spaced from the second adaptor to a second condition in which the jaws engage one another and the first adaptor engages the second adaptor to securely fasten the tool assembly to the gripping mechanism. The first electrical coupling engages the second electrical coupling to electrically connect the tool mechanism to the gripping mechanism. Engagement of the first adaptor with the second adaptor when the second adaptor is misaligned with the first adaptor automatically corrects at least one of angular and longitudinal misalignment between the adaptors. The fin engages at least one of the linear surfaces and helps guide the second adaptor into alignment with the first adaptor.

Other objects and advantages and a fuller understanding of the invention will be had from the following detailed description of the preferred embodiments and the accompanying drawings.

BRIEF DESCRIPTION OF THE DRAWINGS

FIG. 1 is a schematic illustration of a robotic tool system in accordance with an aspect of the present invention.

FIG. 2 is a schematic illustration of a gripping mechanism of the tool system of FIG. 1.

FIG. 3 is a schematic illustration of one jaw of the gripping mechanism of FIG. 2.

FIG. 4 is a side view of the jaw of FIG. 3.

DETAILED DESCRIPTION

Figure 5:
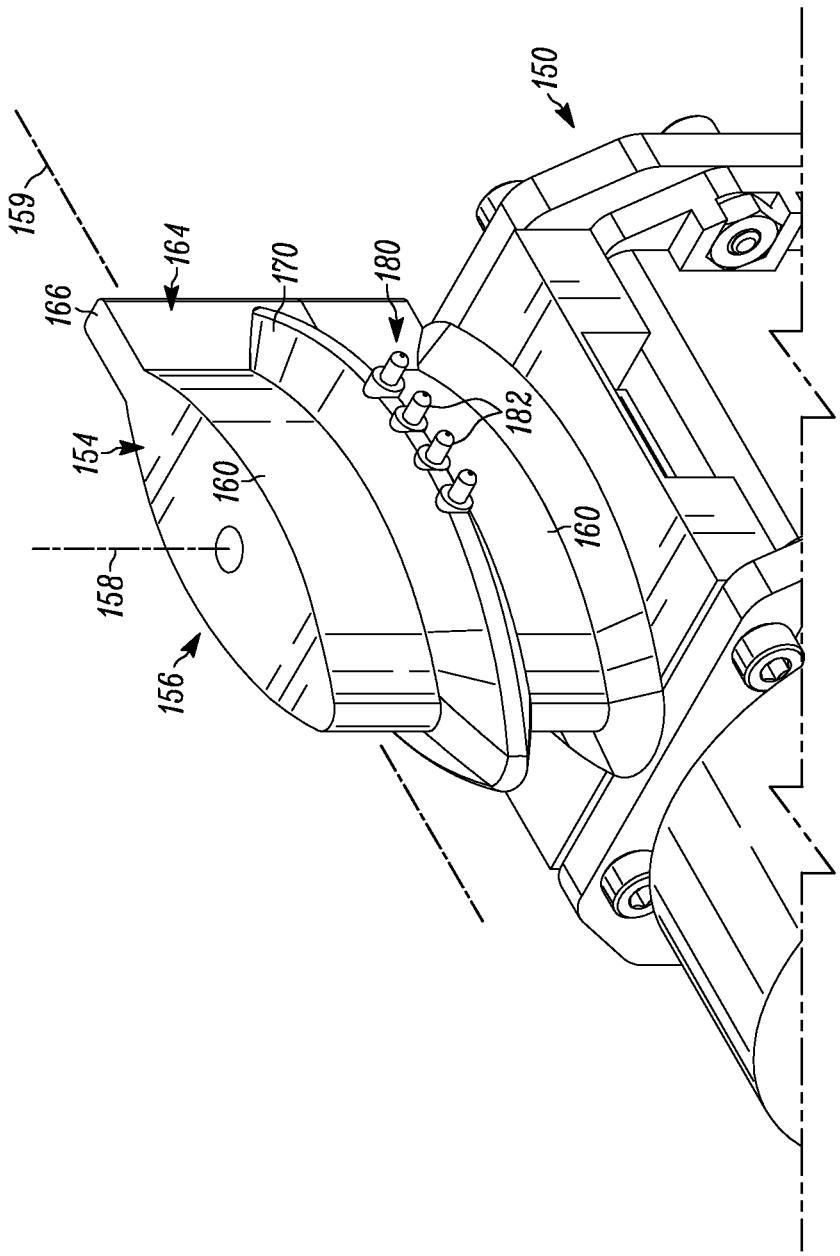
FIG. 5 is an enlarged view of an adaptor for a tool assembly of the tool system of FIG. 1.

The invention relates to robotics and, in particular, relates to self-aligning adaptors for connecting a robotic arm to a tool. FIGS. 1-10 illustrate a robotic tool system 30 in accordance with an embodiment of the present invention.

Referring to FIG. 1, the robotic tool system 30 includes a gripping mechanism 50 and a tool assembly 150. The gripping mechanism 50 is mechanically and electrically connected to an articulatable robotic arm (not shown) operable by a human being. The tool assembly 150 includes a tool 152 for performing a desired task. In particular, the tool 152 may constitute any conventional tool or implement suitable for performing an automated operation, e.g., screwdriver, hammer, wire cutter, pliers, welder or medical instruments such as a syringe or forceps.

Referring to FIGS. 2-4, the gripping mechanism 50 includes a pair of substantially identical first and second jaws 52a, 52b pivotably connected to one another at a hinge 55. The jaws 52a, 52b are positioned on opposing sides of a longitudinal axis 54 that extends through the hinge 55 and parallel to the length of the jaws. Although a description of only the first jaw 52a follows it will be understood that the second jaw 52b includes all the same features as the first jaw with the suffix "b" designating each corresponding feature in the second jaw. An extensive discussion of the second jaw 52b is therefore omitted for brevity.

The first jaw 52a has a generally elongated shape and extends parallel to the axis 54 from a first or proximal end 56a adjacent the hinge 55 to a second or distal end 58a spaced from the hinge. The second end 58a terminates at a tip 60a. The first jaw 52a includes an inner surface 62a facing inwardly towards the axis 54. A plurality of projections or serrations 64a is provided on the inner surface 62a at the tip 60a of the second end 58a. The serrations 64a may be square, triangular or trapezoidal. The serrations 64a, 64b of the jaws 52a, 52b are sized, shaped, and configured to mate with one another. The serrations 64a, 64b on the jaws 52a, 52b therefore extend inwardly towards one another and towards the axis 54.

Proximal to the serrations 64a, the inner surface 62a includes a first portion 72a and a second portion 74a. The first portion 72a is arcuate, e.g., convex relative to the axis 54. The second portion 74a extends from the first portion 72a in direction substantially parallel to the axis 54. Alternatively, the second portion 74 may be arcuate, e.g., convex. As illustrated, the second portion 74a is positioned closer to the hinge 55 than the first portion 72a, although the first portion may alternatively be positioned closer to the hinge than the second portion (not shown).

The first and second portions 72b, 74b of the inner surface 62b of the second jaw 52b are identical to the first and second portions 72a, 72b of the first jaw 52a. Accordingly, the first and second portions 72a, 72b and 74a, 74b are symmetric about the axis 54. Together, the first and second portions 72a, 72b, 74a, 74b of the jaws 52a, 52b define an adaptor 70 of the gripping mechanism 50 (see FIG. 2). It will be appreciated, however, that the second portions 74a, 74b of the jaws 52a, 52b may be omitted such that the adaptor 70 is formed only by the first portions 72a, 72b. In any case, the adaptor 70 extends longitudinally along the axis 54 and vertically about an axis 76 that is perpendicular to the longitudinal axis 54. The adaptor 70 has a substantially spheroid, prolate spheroid or revolved vesica piscis shape due to the configuration of the first and second portions 72a, 72b, 74a, 74b.

Referring to FIG. 4, a recess 100a, 100b is formed in each jaw 52a, 52b. The recess 100a extends from the inner surface 62a away from the axis 54. The recess 100a also extends along the length of the jaw 52a in a direction generally parallel to the longitudinal axis 54. The recess 100a is formed in the first portion 72a of the adaptor 70 and may also be formed in the second portion 74a, as shown.

A first electrical coupling 110 located within the jaw 52a is accessible through the recess 100a. The first electrical coupling 110 includes a circuit board 112a in the first jaw 52a having a plurality of electrical contacts 114a along its length. The electrical contacts 114a are in electrical communication with a power source and controller (not shown) in or connected to the robotic arm. The electrical contacts 114a are capable of receiving and transmitting both serial data and system power. Alternatively or additionally, the first electrical coupling 110 includes a circuit board 112b within the second jaw 52b that is accessible through the recess 100b in the second jaw (not shown). The circuit board 112b includes electrical contacts 114b identical to the electrical contacts 114a in the first jaw 52a.

A slot or indentation 104a extends along the inner surface 62a of the first jaw 52a from the tip 60a to the recess 100a and from the recess to the second portion 74a. The slot 104a extends through the serrations 64a and the first portion 72a. The slot 104a is vertically aligned along the axis 76 with the electrical contacts 114a of the first electrical coupling 110.

Figure 6:
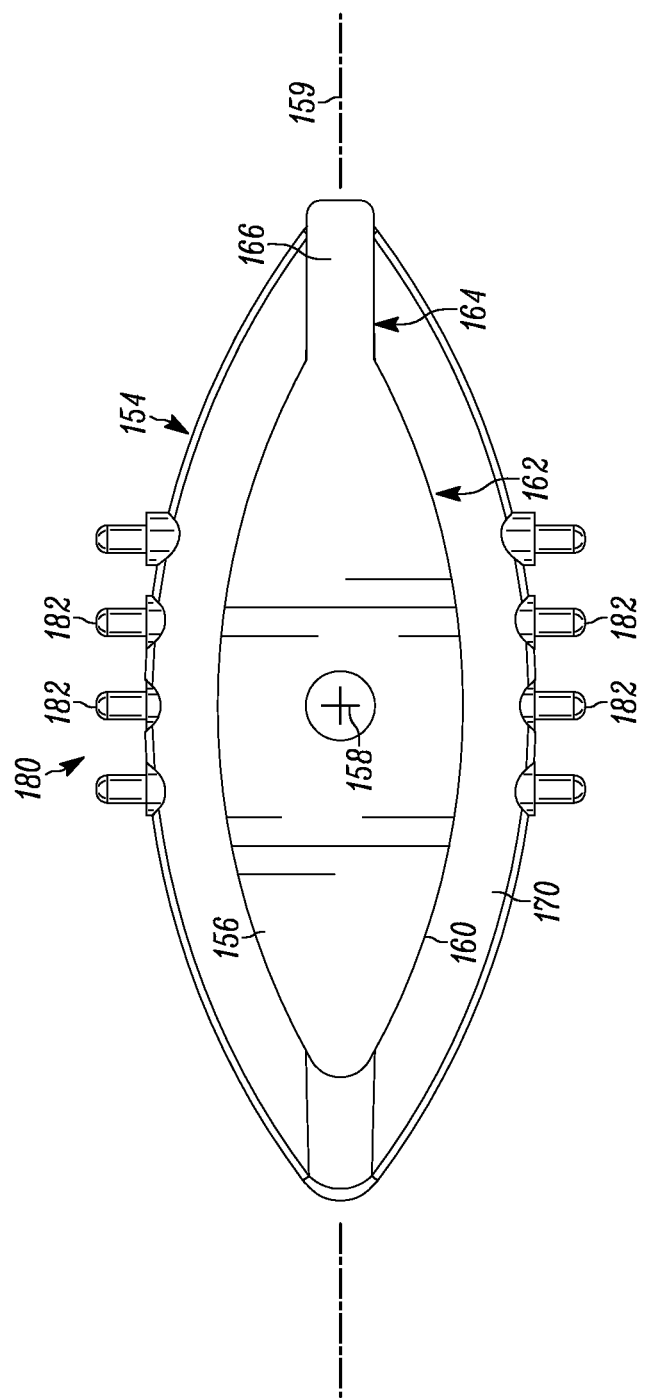
FIG. 6 is a top view of the adaptor of FIG. 5.

Referring to FIGS. 5 and 6, the tool assembly 150 includes an adaptor 154 for releasably connecting the tool assembly to the adaptor 70 of the gripping mechanism 50. The adaptor 154 includes a first portion constituting a projection 156 that extends longitudinally along and is symmetric about an axis 159. The projection 156 is centered about a vertical axis 158 that extends perpendicular to the longitudinal axis 159.

An outer surface 160 of the projection 156 extends around the vertical axis 158. The outer surface 160 has an arcuate or biconvex configuration defining a generally elliptical shape. The outer surface 160 may therefore have, for example, a pointed, prolate spheroid shape or the shape of a revolved vesica piscis. The outer surface 160 is therefore the same configuration as the first portions 72a, 72b of the first adaptor 70. A flange 170 extends radially outward from the outer surface 160 and bifurcates the outer surface. The flange 170 has a substantially triangular or trapezoidal cross-section, although other shapes are contemplated. As viewed from above in FIG. 6, the flange 170 may have a spheroid or prolate spheroid shape such that the periphery of the flange is substantially concentric with the periphery of the outer surface 160.

A second electrical coupling 180 is integrated into or secured to the flange 170. The electrical coupling 180 is electrically connected to the tool 152 and any circuitry or electronics necessary to manipulate or operate the tool. As shown, the electrical coupling 180 includes a plurality of electrically conductive pins 182. The pins 182 extend radially outward from one or both sides of the flange 170 on opposing sides of the longitudinal axis 159. In one example, four pins 182 extend from each side of the flange 170, although more or fewer pins (including zero) may be provided on either side of the flange in accordance with the present invention.

Referring to FIG. 6, the pins 182 are aligned with one another along the outermost periphery of the flange 170. The group of pins 182 on each side of the flange 170 is collectively located nearer one end (the rear end as shown) of the adaptor. In other words, the pins 182 are not centered along the length of the projection 156 such that the center of the projection 156 (at the axis 158) and the collective center of the pins 182 are spaced from one another along the axis 159. The pins 182 may have any construction suitable for transmitting power and data between the gripping mechanism 50 and the tool assembly 150. In one example, the pins 182 are spring-loaded and formed or coated with an electrically conductive material such as gold.

A fin 166 extends along the projection 156 and defines a second portion of the adaptor 154. The fin 166 extends longitudinally in a direction parallel to the axis 158 (vertically as shown in FIG. 5) along the entire height of the projection 156. Unlike the outer surface 160 of the projection 156, however, the fin 166 is not bifurcated by the flange 170. The fin 166 has a substantially rectangular shape, although the fin may likewise have an arcuate or elliptical shape similar to the projection 156. It will be appreciated, however, that the fin 166 may be omitted from the projection 156 and, thus, the adaptor 154 may include only the projection. When present, the fin 166 is configured to have substantially the same or the identical shape as the second portions 74a, 74b of the adaptor 70 and, thus, the adaptors 70, 154 have the same shape.

In an alternative configuration of the present invention, the second electrical coupling 180 is integrated into or secured to a rearward-facing surface of the fin 166 (not shown). In such a construction, the pins 182 are arranged vertically along the fin 166 and extend longitudinally in a direction substantially parallel to the axis 159. Accordingly, the mating first electrical coupling 110, e.g., the circuit board 112 and corresponding electrical contacts 114, would be integrated into the gripping mechanism 50 at a position between the second portions 74a, 74b of the jaws 52a, 52b adjacent to the hinge 55 (not shown).

Figure 7:
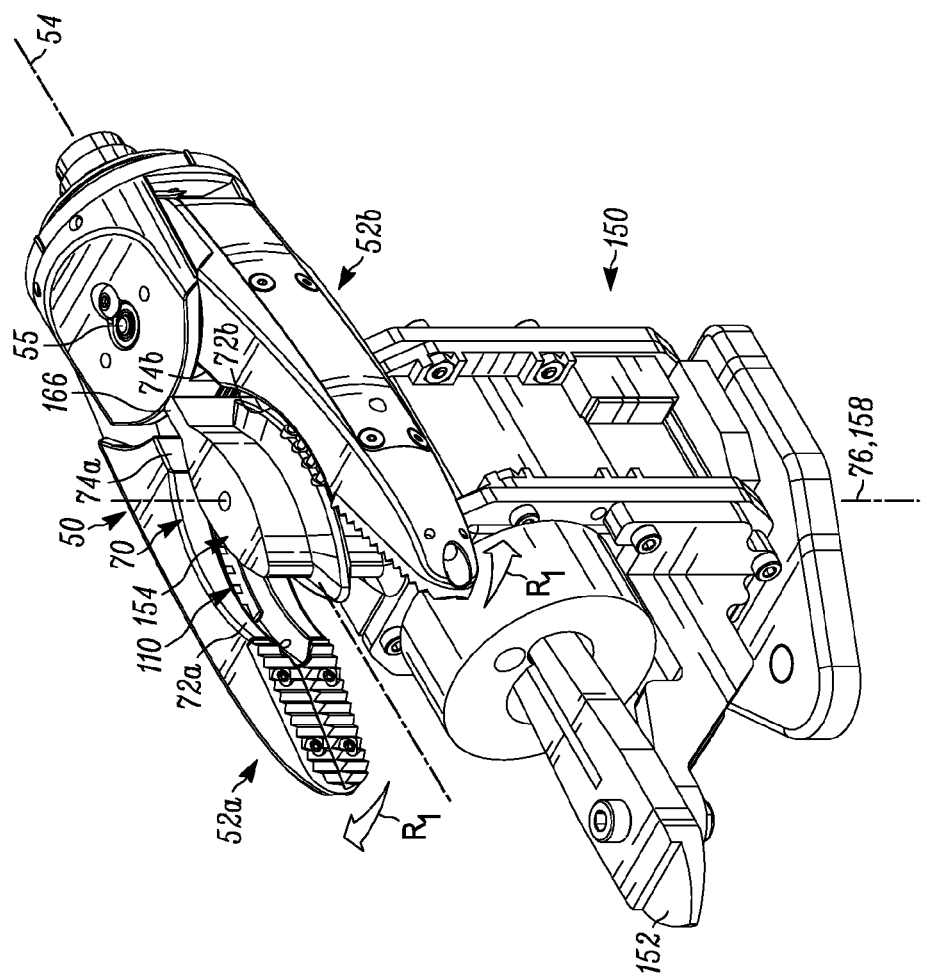
FIG. 7 is a schematic illustration of the gripping mechanism in a first condition in which the gripping mechanism and the tool assembly are initially aligned.
Figure 8:
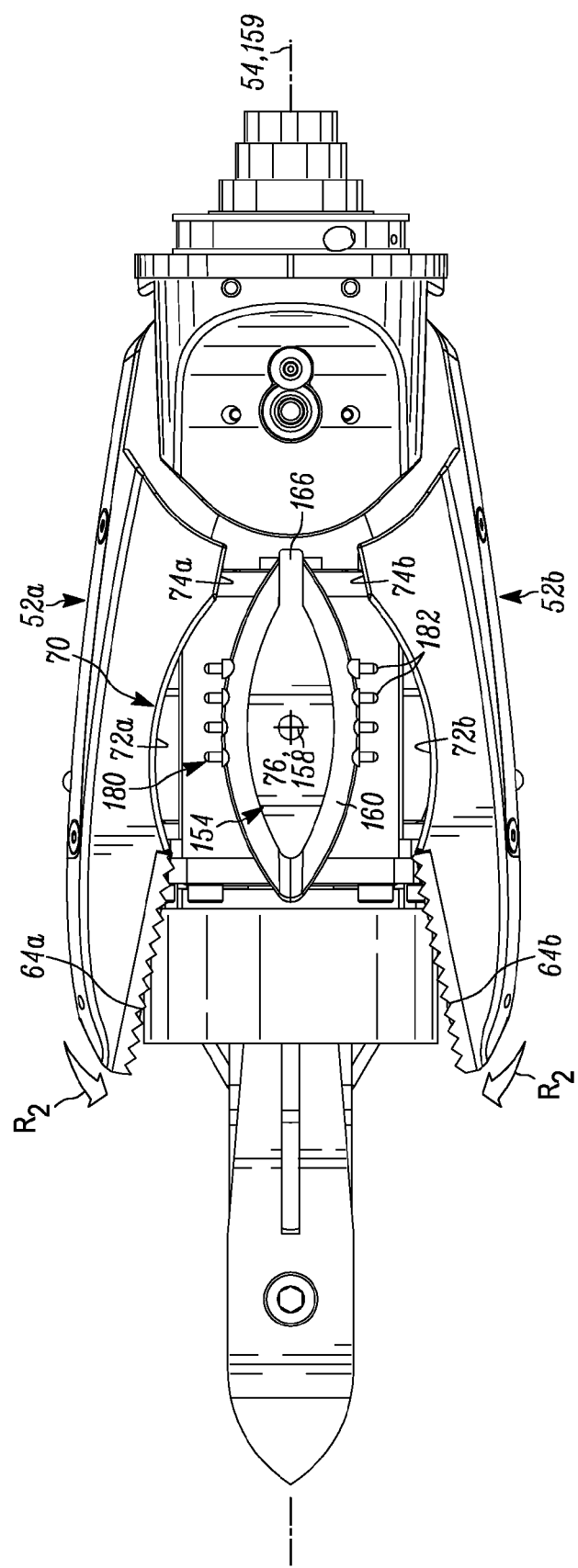
FIG. 8 is a top view of the gripping mechanism of FIG. 7.

In operation, and referring to FIGS. 7 and 8, the jaws 52a, 52b are initially spread or opened as indicated generally by the arrow $R_1$ out of engagement with one another, thereby enlarging the size of the adaptor 70. The gripping mechanism 50 is moved towards a particular tool assembly 150 having a desired tool 152 thereon. The jaws 52a, 52b are placed in a first condition substantially encircling the adaptor 154 of the tool assembly 150. In this condition, the electrical couplings 110, 180 are substantially aligned with one another. More specifically, the longitudinal axes 78, 159 of the gripping mechanism 50 and the tool assembly 150 are substantially co-axial with one another. The vertical axes 76, 158 are likewise substantially co-axial with one another.

The jaws 52a, 52b are then actuated to close the jaws and, thus, close the adaptor 70 around the adaptor 154 of the tool assembly 150. As shown in FIG. 8, the jaws 52a, 52b move inward towards one another in the direction indicated generally by the arrow $R_2$ until the serrations 64a, 64b engage one another. When this occurs, the first portions 72a, 72b of the adaptor 70 engage the flange 170 of the adaptor 154 and the second portions 74a, 74b of the adaptor 70 engage the fin 166 of the adaptor 154 (see FIG. 1). Since the adaptors 70, 154 are initially aligned with one another, i.e., the axes 76, 158 and the axes 78,159 are co-axial with one another, the serrations 64a, 64b move without obstruction into engagement with one another, thereby placing the jaws 52a, 52b in a second condition. In this condition, the adaptor 154 is entrapped within the adaptor 70 and the jaws 52a, 52b apply a clamping force upon the adaptor 154. More specifically, the first portions 72a, 72b of the jaws 52a, 52b press against the outer surface 160 of the projection 156 and the second portions 74a, 74b press against the fin 166. The engagement occurs with little to no relative movement between the adaptors 70, 154 due to the initial alignment and matching shapes of the adaptors.

Furthermore, due to its shape and location along the adaptor 70, the fin 166—when present—helps prevent relative rotational movement between the adaptors 70, 154 when the jaws 52a, 52b are fully closed. Accordingly, the fin 166 helps prevent relative rotational movement between the gripping mechanism 50 and tool assembly 150. In particular, use of the tool 152 imparts torque and/or moments upon the tool, which are translated to the tool assembly 150 and ultimately to the gripping mechanism 50 via the adaptors 50, 154. The fin 166 is configured to resist these torques and moments to prevent relative movement between the adaptors 50, 154. This construction therefore ensures a reliable, secure mechanical connection between a gripping mechanism 50 and tool assembly 150 aligned with one another.

A reliable electrical connection is simultaneously established between the gripping mechanism 50 and the tool assembly 150 when the jaws 52a, 52b reach the second condition. More specifically, as the jaws 52a, 52b close around the adaptor 154, the protruding pins 182 on the adaptor 154 move through the recesses 100a, 100b into engagement with the contacts 114a, 114b on the circuit boards 112a, 112b, thereby electrically connecting the gripping mechanism 50 with the tool assembly 154. When the pins 182 are positioned on the fin 166 (not shown), the contacts 114 are aligned with the pins along the axis 76 and the gripping mechanism 50 moved along the axis 54 until the pins and contacts are electrically connected to one another (see FIG. 7). The jaws 52a, 52b can then be closed to reach the second condition and maintain the electrical connection between the pins 182 and the contacts 114.

The construction of the present invention also provides a reliable, secure mechanical and electrical connection between a misaligned gripping mechanism 50 and tool assembly 150 by automatically or self-aligning the components. When the jaws 52a, 52b are in the first condition ready to pick up the tool assembly 150, the adaptor 154 may for example, be tilted and/or rotated about the axis 159, tilted and/or rotated about the axis 158, and/or one or both axes 158, 159 of the adaptor 154 may be spaced from the corresponding axis 76, 78 of the adaptor 70. The adaptor 154 may therefore be initially misaligned with the adaptor 70 in any number of axial, tilted or rotational directions. The adaptors 70, 154 of the present invention, however, are configured to automatically or self-align with one another in these situations where the gripping mechanism 50 and the tool assembly 150 are misaligned with one another. The self-alignment ensures that a mechanically secure and electrically conductive connection is readily established between the gripping mechanism 70 and the tool assembly 150.

Figure 9:
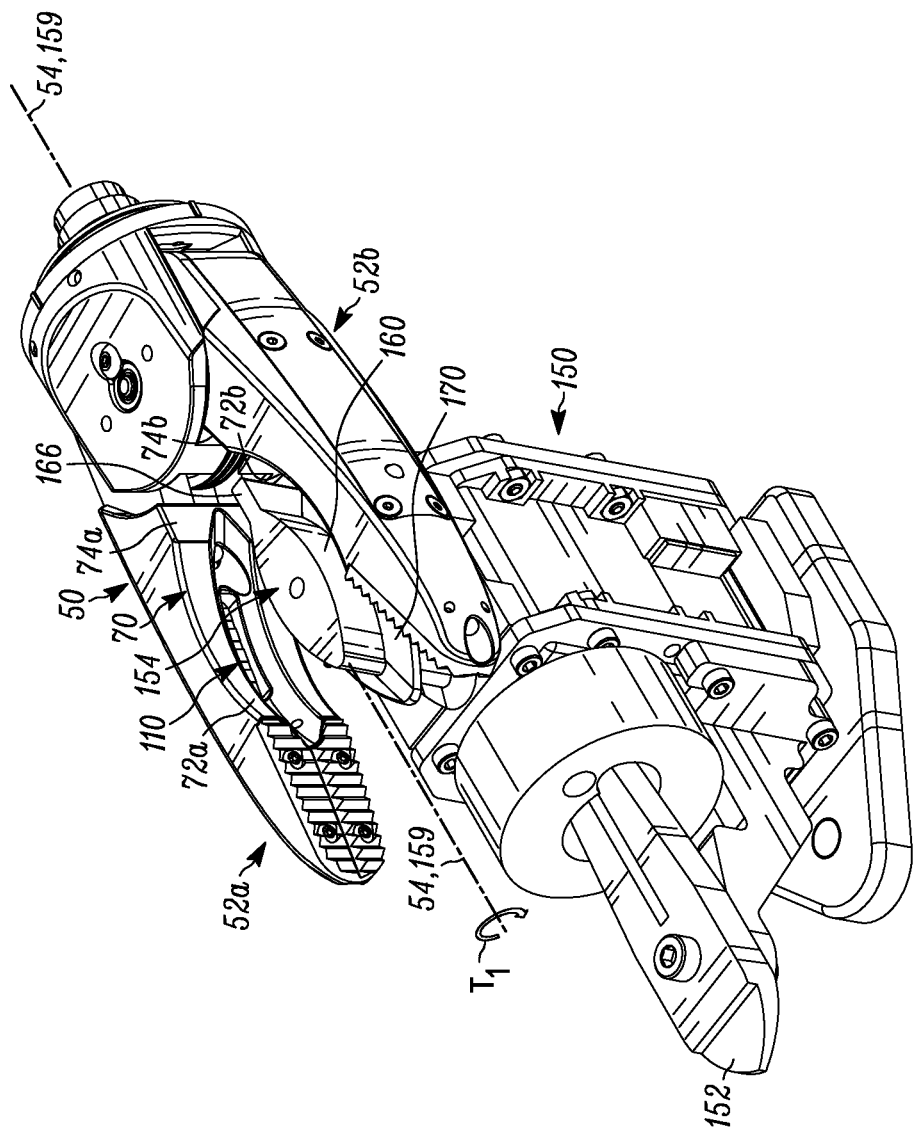
FIG. 9 is a schematic illustration of the gripping mechanism in a first condition in which the gripping mechanism and the tool assembly are initially misaligned.
Figure 10:
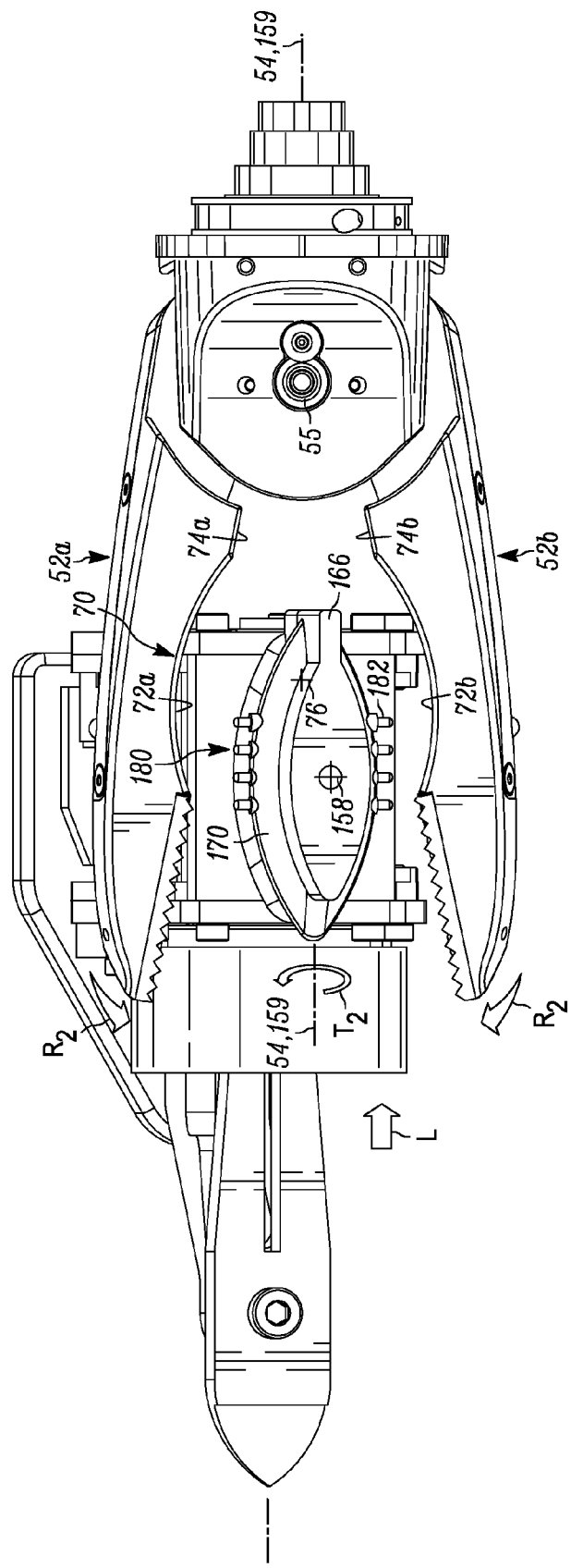
FIG. 10 is a top view of the gripping mechanism of FIG. 9.

One example of a gripping mechanism 50 that is initially misaligned with a tool assembly 150 is illustrated in FIGS. 9 and 10. In FIG. 9, it is clear that the center of the adaptor 154 of the tool assembly 150 (at the axis 158) is longitudinally or linearly displaced to the left of the center of the adaptor 70 of the gripping mechanism 50 (at the axis 76). The adaptor 154 of the tool assembly 150 is also rotated downward about the longitudinal axis 159 towards the second jaw 52b in the direction indicated generally by the arrow $T_1$ such that the vertical axes 76, 158 of the adaptors 70, 154 are not parallel to one another. The adaptors 70, 154 are therefore not concentric with one another due to the linear and angular misalignment between the gripping mechanism 50 and the tool assembly 150.

When the jaws 52a, 52b begin closing, the arcuate or rounded spheroid shape of the adaptor 70 engages the similarly shaped and misaligned adaptor 154. Further closure of the jaws 52a, 52b causes the adaptor 70 to draw the adaptor 154 towards the first end 56a, 56b of the jaws in the direction indicated generally by the arrow L, which moves the axes 76, 158 towards one another. The adaptor 70 simultaneously causes the adaptor 154 to rotate about the axis 159 in a direction $T_2$ opposite to the direction $T_1$, which moves the vertical axes 76, 158 towards a parallel relationship. Due to its particular shape and position along the adaptor 154, the fin 166 helps guide movement of the adaptor 154 into alignment with the adaptor 70. In particular, the rectangular fin 166 makes the proximal end 56a of the adaptor 70 asymmetric relative to the distal end 58a. The fin 166 therefore ensures that the adaptors 70, 154 can only mate in a single, aligned configuration, i.e., the jaws 52a, 52b cannot close without the adaptors 70, 154 becoming aligned due to the spheroid shape of the adaptors 70, 154 and the shape/position of the fin. Accordingly, as one or more of the second portions 74a, 74b of the adaptor 70 engage the rectangular fin 166 of the adaptor 154, the linear and/or rotational misalignment of the adaptors 70, 154 is automatically corrected.

As these self-aligning movements occur, the pins 182 on the adaptor 154 are drawn into the slots 104a, 104b on the jaws 52a, 52b to help guide the pins into the recesses 100a, 100b and into engagement with the contacts 114a, 114b. The spring bias of the pins 182 ensures that the pins 180 collapse upon engagement with the slots 104a, 104b and expand outward once the recesses 100a, 100b are reached without damaging the pins. When the pins 182 are positioned on the fin 166 (not shown), the pins are drawn rearward and vertically aligned with the contacts 114 into engagement with the contacts 114. The jaws 52a, 52b can then be closed to reach the second condition and maintain the electrical connection between the pins 182 and the contacts 114.

By the time the jaws 52a, 52b are fully closed and reach the second condition (see FIG. 1), the adaptor 154 has been linearly displaced and rotated until the adaptors 70, 154 become aligned with one another. As noted, the fin 166 helps locate and self-align the adaptors 70, 154 while resisting tool 154 torques and moments, thereby forming a secure mechanical connection between the gripping mechanism 50 and the tool assembly 150. Likewise, the pins 180 are now engaged with the electrical contacts 114a, 114b to establish the electrical connection between the gripping mechanism 50 and the tool assembly 150.

Again, the self-alignment between the adaptors 70, 154 is accomplished due to the similar arcuate or spheroid shape of each adaptor, which allows the adaptors to slide, tilt and/or rotate relative to one another upon initial engagement therebetween until the adaptors become aligned with one another. The shape of the adaptors 70, 154 therefore allows the gripping mechanism 50 to quickly, easily, and reliably grasp the misaligned tool assembly 150 with the jaws 52a, 52b. Due to this construction, the relative alignment between the adaptors 70, 154 need not be precise because the curved, spheroid shape of each adaptor ensures that the jaws 52a, 52b close—move to the second condition—as the adaptor 154 adjusts its position to correct for even substantially angular, e.g., pitch and roll, and linear, e.g., vertical and longitudinal, misalignments between the adaptors.

The slot 104a, 104b in each jaw 52a, 52b is sized to accommodate the pins 182 on the adaptor 154 and help self-align the adaptors 70, 154 with one another. The pins 182 can slide along the slots 104a, 104b relative to the jaws 52a, 52b while the jaws automatically align the adaptor 154 with the adaptor 70. Since the slots 104a, 104b extend along the length of each jaw 52a, 52b and connect to the recesses 100a, 100b in which the circuit boards 112a, 112b are located, the slots help guide the moving pins 182 into the recesses and, thus, guide the pins into engagement with the electrical contacts 114a, 114b of the circuit boards. To this end, one or both ends of each slot 104a, 104b may be tapered to initially capture more severely misaligned pins 182 and then narrow towards the recesses 100a, 100b to help correct the misalignment. The spring-biased construction of the pins 182 helps to prevent damage to the pins during alignment of the adaptors 70, 154. The slots 104 are configured to prevent engagement of the pins 182 with the serrations 64a, 64b.

Regardless of the whether the adaptors 70, 154 are aligned or misaligned, once the jaws 52a, 52b engage one another and the adaptor 154 to place the jaws in the second condition, the device 30 can operate and/or manipulate the tool 152 selected. More specifically, the user operates the robotic arm which, through the gripping mechanism 50 and the tool assembly 150, operates the tool 152. Articulation of the robotic arm causes the gripping mechanism 50 to articulate in kind. Since the gripping mechanism 50 firmly grasps the tool assembly 150 via the adaptors 70, 154, articulating the robotic arm likewise articulates the tool assembly 150 and the tool 152.

As noted, placing the jaws 52a, 52b in the second condition with aligned or misaligned components 50, 150 establishes an electrical path from the robotic arm, to the gripping mechanism 50, through the tool assembly 150, and ultimately to the tool 152. Power and data signals can be sent by the user through the robotic arm circuitry, to the first electrical coupling 110, into the second electrical coupling 180, and ultimately to the tool 152. Accordingly, the robotic arm can be used to send both power and data signals through the electrical path to the tool 152 in order to operate the tool, e.g., grasping, cutting, piercing, soldering, etc.

The circuit boards 112a, 112b in each jaw 52a, 52b provide a redundant electrical connection between the gripping mechanism 50 and the tool assembly 150. More specifically, providing electrical contacts 114a, 114b in each jaw 52a, 52b ensures reliable electrical contact between the gripping mechanism 50 and the tool assembly 150 whether the adaptors 70, 154 are aligned or misaligned upon initial engagement with one another. Furthermore, the offset positioning of the pins 182 along the length of the adaptor 154 ensures that if the tool assembly 150 is grasped incorrectly, e.g., the tool 152 is backwards, the data transferring pins on the adaptor 154 do not engage the power transferring contacts 114a, 114b on the circuit boards 112a, 112b in the jaws 52a, 52b, thereby resulting in an unpowered tool assembly. To this end, the power transferring contacts 114a, 114b may be located at only one end, e.g., nearer the rear end, of the adaptor 154. The offset configuration of the pins 182 also helps to ensure that electrical connection between the pins and the contacts 114a, 114b does not occur until the jaws 52a, 52b approach or fully reach the second condition.

The adaptors 70, 154 of the present invention may include additional or alternative features that help form a secure connection between the gripping mechanism 50 and the tool assembly 150. For example, the inner surface(s) 62a, 62b of the jaws 52a, 52b and portions of the adaptor 154 may be magnetic (not shown). In such a case, the adaptors 70, 154 may be mechanically and magnetically secured to one another. The magnetic portions may constitute permanent magnets or electromagnets that are activated and deactivated via circuitry in the first and second electrical couplings 110, 180.

In any case, the adaptors 70, 154 of the present invention are advantageous in that they allow a human operator, e.g., a teleoperator, of a robotic arm to freely acquire and exchange tools 152 within the workspace on an as-needed basis. Due to the self-aligning construction of the adaptors 70, 154, the exchange of tools 152 and assorted tool assemblies 150 by the gripping mechanism 50 demands a relatively low level of precision in the movement of the arm, and maneuvering of the robotic arm to a dedicated tool stand or tool changing rack is therefore unnecessary.

As noted, the tool system 30 of the present invention can support a wide range of tools 152, including powered and unpowered tools. Powered tools use the power received from the robotic arm via the electrical couplings 110, 180 to drive a servo motor (not shown) operating an active end effector such as a wire cutter, screw driver or drill. Unpowered tools rely upon the motion of the robotic arm to operate a passive end effector such as a knife, exacto blade, punch or hook. The tool system 30 of the present invention therefore provides the operator with rapid and convenient access to a wide variety of tools 152 that can be advantageously freely grasped and released at any desired location within the working envelope. Accordingly, the tool system 30 of the present invention is particularly useful in immersive teleoperation interfaces seeking to provide an intuitive interaction within the remote work environment.

The preferred embodiments of the invention have been illustrated and described in detail. However, the present invention is not to be considered limited to the precise construction disclosed. Various adaptations, modifications and uses of the invention may occur to those skilled in the art to which the invention relates and the intention is to cover hereby all such adaptations, modifications, and uses which fall within the spirit or scope of the appended claims.

Having described the invention, the following is claimed:

1. A robotic tool system comprising:
    a robotic gripping mechanism including a pair of movable jaws, each jaw having a convex inner surface that cooperate to define a first adaptor having a spheroid shape, a first electrical coupling being positioned within at least one of the jaws; and
    a tool assembly including a tool and a spheroid second adaptor connected to the tool, a second electrical coupling being positioned within the second adaptor;
    the jaws being movable towards one another from a first condition spaced from the second adaptor to a second condition in which the first adaptor engages the second adaptor to securely fasten the tool assembly to the gripping mechanism, the first and second electrical couplings being electrically connected with one another when the jaws are in the second condition, engagement of the first adaptor with the second adaptor when the second adaptor is misaligned with the first adaptor automatically correcting at least one of angular and longitudinal misalignment between the adaptors to allow the jaws to reach the second condition.

2. The tool system of claim 1, wherein a longitudinal center of the second electrical coupling is offset from the center of the second adaptor along the longitudinal axis.

3. The tool system of claim 1, wherein a slot extends along at least one of the jaws for guiding the second electrical coupling into engagement with the first electrical coupling.

4. The tool system of claim 1, wherein the first adaptor further includes a linear surface extending from each convex surface, the second adaptor further including a rectangular fin that engages at least one of the linear surfaces to guide the second adaptor into alignment with the first adaptor and allow the jaws to reach the second condition.

5. A robotic tool system comprising:
    a gripping mechanism including a pair of movable jaws that extend along a longitudinal axis, each jaw having a convex inner surface relative to the axis and a linear surface extending from the convex surface that cooperate to define a substantially spheroid first adaptor, a first electrical coupling having a plurality of electrical contacts being positioned within at least one jaw; and
    a tool assembly including a tool and a second adaptor connected to the tool, the second adaptor having a spheroid projection and a rectangular fin extending from the projection, a second electrical coupling having a plurality of electrically conductive pins being located on the second adaptor;
    the jaws being movable towards one another from a first condition spaced from the second adaptor to a second condition in which the jaws engage one another and the first adaptor engages the second adaptor to securely fasten the tool assembly to the gripping mechanism and the first electrical coupling engages the second electrical coupling to electrically connect the tool mechanism to the gripping mechanism, engagement of the first adaptor with the second adaptor when the second adaptor is misaligned with the first adaptor automatically correcting at least one of angular and longitudinal misalignment between the adaptors, the fin engaging at least one of the linear surfaces and helping guide the second adaptor into alignment with the first adaptor.

6. A robotic tool system comprising:
    a gripping mechanism including a pair of movable jaws that extend along a longitudinal axis, each jaw having an inner surface which cooperate to define a first adaptor, a first electrical coupling being positioned within at least one of the jaws; and
    a tool assembly including a tool and a second adaptor connected to the tool and having a projection, a second electrical coupling being positioned on the second adaptor;
    the jaws being movable towards one another from a first condition spaced from the second adaptor to a second condition in which the first adaptor engages the projection of the second adaptor to securely fasten the tool assembly to the gripping mechanism, the first and second electrical couplings being electrically connected with one another when the jaws are in the second condition.

7. The tool system of claim 6, wherein engagement of the first adaptor with the second adaptor when the adaptors are misaligned with one another automatically aligns the adaptors to allow the jaws to reach the second condition.

8. The tool system of claim 7, wherein the inner surface of each jaw is convex relative to a longitudinal axis of the jaws and a linear surface extends from each convex surface, wherein the projection on the second adaptor is biconvex and includes a rectangular fin extending from the projection, the linear surfaces of the first adaptor mating with the rectangular fin of the second adaptor when the jaws are in the second condition, wherein the rectangular fin engages at least one of the linear surfaces to guide the second adaptor into alignment with the first adaptor and allow the jaws to reach the second condition.

9. The tool system of claim 6, wherein engagement of the first adaptor with the second adaptor automatically corrects at least one of angular and longitudinal misalignment between the adaptors.

10. The tool system of claim 6, wherein the first electrical coupling includes a circuit board having electrical contacts accessible through a slot in the inner surface of one of the jaws, the second electrical coupling including a plurality of electrically conductive pins extending from the outer surface of the second adaptor, the pins engaging the electrical contacts when the jaws are in the second condition to electrically connect the tool assembly to the gripping mechanism.

11. The tool system of claim 6, wherein a longitudinal center of the second electrical coupling is offset from the center of the second adaptor along the longitudinal axis.

12. The tool system of claim 6, wherein the first electrical coupling includes first electrical contacts within one of the jaws and second electrical contacts in the other of the jaws, the second electrical coupling including a plurality of pins that, when the jaws are in the second condition, mate with the first electrical contacts to electrically connect the gripping mechanism to the tool assembly and mate with the second electrical contacts to form a redundant electrical connection between the gripping mechanism and the tool assembly.

13. The tool system of claim 6, wherein a slot extends along at least one of the jaws for guiding the second electrical coupling into engagement with the first electrical coupling.

14. The tool system of claim 6, wherein the first and second adaptors are magnetic.

15. The tool system of claim 6, wherein both the first adaptor and the second adaptor have a spheroid shape.

* * * * *